Oct. 30, 1962  J. J. MORGAN  3,060,750
BALANCED ACCELEROMETER
Filed Dec. 5, 1958
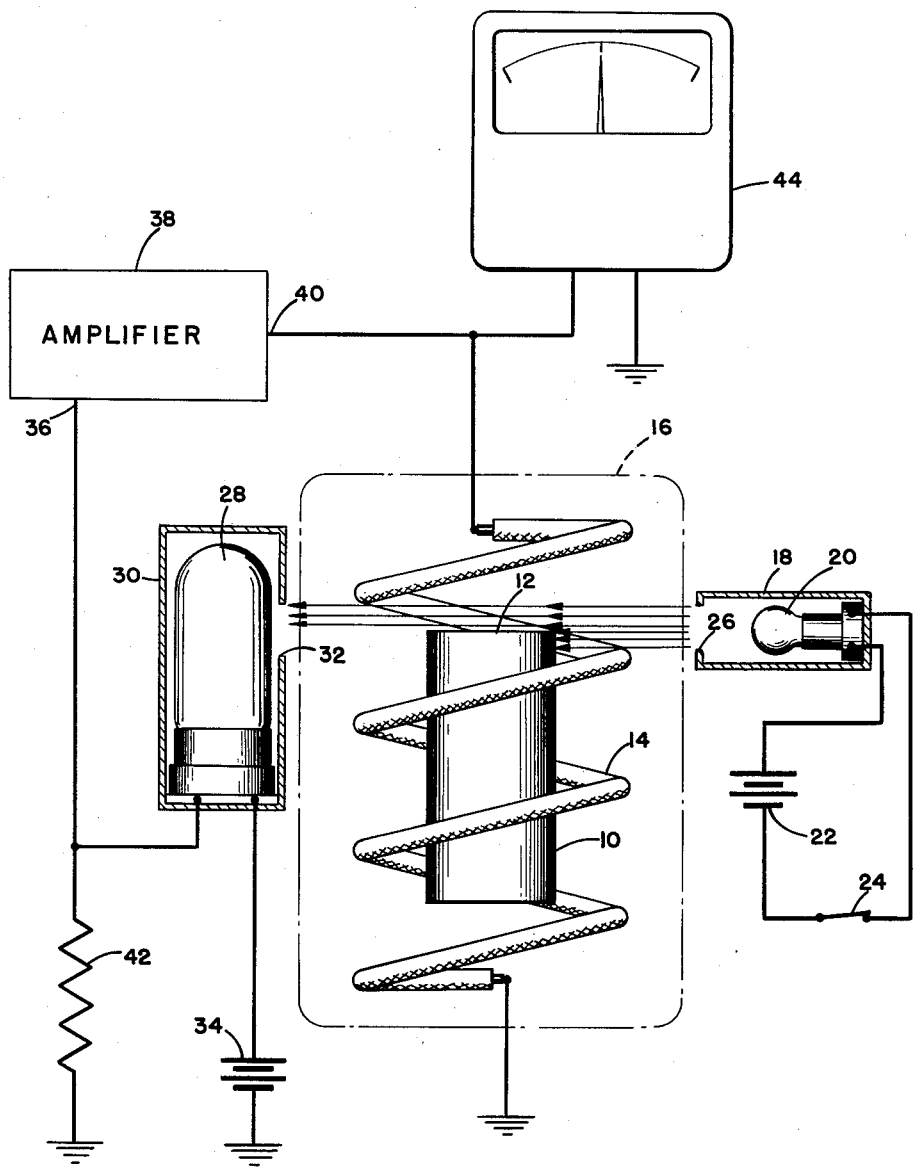
INVENTOR.
JAMES J. MORGAN
BY Knox & Knox

United States Patent Office 3,060,750
Patented Oct. 30, 1962

3,060,750
BALANCED ACCELEROMETER
James J. Morgan, Box 296B, Del Mar, Calif.
Filed Dec. 5, 1958, Ser. No. 778,528
2 Claims. (Cl. 73—517)

The present invention relates generally to sensing instruments and more particularly to a balanced accelerometer.

The primary object of this invention is to provide an accelerometer having a sensing element magnetically suspended in an evacuated chamber to eliminate friction and obtain maximum sensitivity.

Another object of this invention is to provide an accelerometer having photoelectric means to detect movement of the sensing element, no mechanical contact being made between the sensing element and any other part of the mechanism.

Another object of this invention is to provide an accelerometer in which part of the acceleration signal produced is fed back to the magnetic suspension means, so that the magnetic field is adjusted to compensate for movement of the sensing element and this dampens the motion to prevent oscillation.

Still another object of this invention is to provide an accelerometer which is designed to indicate acceleration or deceleration in either direction along one linear axis, and which retains its sensitivity even when subjected to cross acceleration loads in other directions.

A further object of this invention is to provide an accelerometer which is compact, light in weight and contains a minimum of parts.

Finally, it is an object to provide an accelerometer of the aforementioned character which is simple and convenient to assemble and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which the single FIGURE is a partial schematic wiring diagram of the accelerometer.

The core of the accelerometer is a sensing element 10 comprising a ferromagnetic cylinder having a flat end face 12 normal to the cylinder axis. The sensing element 10 is suspended in a magnetic field coil 14 suitably energized to support the mass of the element in a predetermined position within the coil, the sensing element and coil being enclosed in an evacuated container 16, indicated in broken line. The container 16 is partially or entirely made of transparent material such as glass or plastic. Fixed outside the container 16 is a light source 18 containing a lamp 20, which may be energized by a simple circuit having a battery 22 and switch 24, the actual circuit being unimportant. The light source 18 has a beam opening 26 which directs a concentrated light beam diametrically across the end face 12 of the sensing element 10, said light source being located so that the sensing element obstructs substantially one half of the light beam under zero acceleration or static conditions.

On the other side of the sensing element 10, diametrically opposite the light source 18 and also outside the container 16, is a photoelectric cell 28 mounted in a shield 30 which has a small window 32. The shield 30 is positioned so that the window 32 is aligned with the beam axis of the light, from the light source opening 26, in order that the photoelectric cell 28 can receive all the light from lamp 20, but is shielded from extraneous light which might interfere with the operation of the accelerometer. The photoelectric cell 28 is energized by a battery 34, or equivalent power source, said battery also being connected to ground. The output of the photoelectric cell 28 is connected to the input 36 of an amplifier 38 of conventional design, the output 40 of said amplifier being connected to one end of the field coil 14, the other end of which is grounded, and a resistor 42 is connected from the amplifier input 36 to ground. A meter 44 is also connected across the output 40 to provide a direct indication of the acceleration.

The accelerometer is of the force-balance type in which a sensing mass is mounted in such a manner as to have freedom of movement in a predetermined linear direction, so that any acceleration force in that direction will cause the mass to move from its place of rest. The mass is balanced by a restraining force which tends to hold it at rest, whereby any acceleration force must overcome the restraining force in order to move the mass. Thus the displacement of the mass is directly proportional to the magnitude of the acceleration.

In the arrangement illustrated, the restraining force is the magnetic field created in the coil 14, and the stronger the field the greater the resistance to displacement of the mass or sensing element 10. Therefore the sensitivity of the accelerometer is controlled directly by the field strength of the coil 14. In static or zero load condition, the sensing element 10 is suspended so that one end obstructs the light beam, indicated by directional arrows, substantially one half of the beam being blocked thereby. The other half of the light beam is projected across the flat end face 12, through the window 32 to strike the photoelectric cell 28.

When acceleration occurs, as for example when the accelerometer moves upwardly, the sensing element 10 tends to lag or move downwardly in the coil 14. In doing so, the sensing element allows more of the light beam to strike the photoelectric cell 28, which consequently increases its output due to the increased excitation. The resultant signal is amplified by the amplifier 38 and the increased current is fed to the field coil 14, so increasing the magnetic field strength and resisting further displacement of the sensing element 10. Thus the restraining force or coil field strength is directly proportional to the output of the photoelectric cell 28 which, in turn, is controlled by the displacement of the sensing element 10 due to the acceleration force. For this reason the voltage across the field coil 14 is in direct proportion to the acceleration force and it is this voltage which is indicated on the meter 44 in terms of acceleration. The closed loop from the photoelectric cell, through the amplifier, to the field coil provides constant damping of the sensing element 10, so that oscillation and overriding are prevented.

When acceleration decreases, the sensing element 10 tends to return to normal position and obstructs more of the light beam, causing a decreased output from the photoelectric cell 28 and a corresponding reduction in the voltage across the field coil 14. When subjected to deceleration, or acceleration in the opposite direction, the sensing element 10 moves upwardly, cutting off the light beam and reducing current flow in the circuit. The meter 44 is adjusted so that the inherent voltage in the field coil 14, needed to hold the sensing element 10 at neutral position, provides a zero or no-acceleration reading on the meter.

The mounting of the light source 18 and photoelectric cell 28 may be arranged to suit and the entire assembly can be made into a very compact, self-contained unit, suitable for hand held use or for mounting in a vehicle, aircraft, or missile. The accelerometer provides indication of acceleration only along the axis of the sensing element 10, the indication being controlled by motion of the sensing element across the light beam. Thus lateral motion of the sensing element has no effect on the meter reading and the accelerometer is insensitive to cross acceleration.

By proper choice of components, the accelerometer may be made extremely sensitive to the degree that it may be used as a gravimeter for geological work. By adjusting the meter 44 to zero at a particular location, any changes in the local gravity field at other locations will cause variation in the meter readings and may be tabulated to provide a gravity field pattern.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. An accelerometer, comprising: an electromagnetic field coil; a source of voltage connected to said coil to produce a magnetic field therein; a flat ended, cylindrical ferromagnetic sensing element suspended in said coil entirely by the magnetic field; a light source operatively mounted on one side of said coil and positioned to direct a beam of light across said flat end of said sensing element; a photoelectric cell mounted on the other side of said coil and positioned to receive the light from said light source, whereby motion of said sensing element in one plane obstructs the light beam and varies the amount of light reaching said photoelectric cell; said photoelectric cell being operatively connected between said source of voltage and said coil, so that the voltage in the coil varies in proportion to the amount of light reaching said photoelectric cell; and an indicator connected across said coil to indicate the voltage therein.

2. An accelerometer, comprising: a transparent evacuated chamber; an electromagnetic field coil in said chamber; a source of voltage connected to said coil to produce a magnetic field therein; a flat ended, cylindrical ferromagnetic sensing element suspended in a non-revolving manner in said coil entirely by the magnetic field; a light source operatively mounted on one side of said chamber and positioned to direct a beam of light across said flat end of said sensing element; a photoelectric cell mounted on the other side of said chamber to receive the light from said light source, whereby motion of said sensing element in one plane causes said flat end to obstruct the light beam and varies the amount of light reaching said photoelectric cell; said photoelectric cell being operatively connected between said source of voltage and said coil, so that the voltage in the coil varies in proportion to the amount of light reaching said photoelectric cell; and an indicator connected across said coil to indicate the voltage therein.

References Cited in the file of this patent

UNITED STATES PATENTS

| | | |
|---|---|---|
| 2,498,997 | McLean | Feb. 28, 1950 |
| 2,591,921 | Cosgriff et al. | Apr. 8, 1952 |
| 2,660,062 | Frowe | Nov. 24, 1953 |
| 2,686,864 | Wroughton et al. | Aug. 17, 1954 |
| 2,691,306 | Beams | Oct. 12, 1954 |
| 2,695,165 | Hansen | Nov. 23, 1954 |
| 2,769,337 | Rich | Nov. 6, 1956 |
| 2,856,238 | Dacus | Oct. 14, 1958 |
| 2,919,583 | Parker | Jan. 5, 1960 |